Patented Jan. 25, 1949

2,460,186

UNITED STATES PATENT OFFICE 2,460,186

COATING COMPOSITION COMPRISING AN AMIDE-ALDEHYDE RESIN AND A POLYESTER OF 2-ETHYL HEXANEDIOL-1,3 AND A DICARBOXYLIC ACID AS A PLASTICIZER

Eugene W. Moffett, Milwaukee, Wis., assignor to Pittsburgh Plate Glass Company, Allegheny County, Pa., a corporation of Pennsylvania No Drawing. Application March 7, 1946, Serial No. 652,806

17 Claims. (Cl. 260—31.6)

The present invention relates to the plasticization of synthetic resins and it has particular relation to the plasticization of soluble grades of resins obtained by the condensation of amides of carbonic and cyanuric acids such as urea or melamine and aldehydes such as formaldehyde.

Some of the objects of the invention are to provide plasticizers for resins of the foregoing type which are of low volatility, high compatibility with the resins, highly effective as plasticizers in the resins, soluble in inexpensive solvents for the resins, which forms a plasticized resin composition of high gloss, of high resistance to discoloration and decomposition by heat, and high resistance to the action of alkalies, or the like agencies.

These and other objects of the invention will be apparent from consideration of the following specification and the appended claims.

Heretofore, certain resinous products obtained by the condensation of formaldehyde and certain amides of di- or tribasic acids such as melamine and urea, have enjoyed extensive commercial application. Resins from these amides are characterized by high heat stability, excellent color and are also relatively inexpensive to produce. However, films obtained by coating surfaces to be protected with solutions of such resins have not been entirely satisfactory because the resins were quite brittle and did not have sufficient degree of flexibility or adhesion.

In order to improve these properties, it has been proposed to incorporate into the resins or into appropriate solutions of the resins plasticizers or modifiers adapted to increase flexibility and adhesion. However, as evidenced by the "Handbook of Plastics," Ellis and Simonds, copyrighted 1943, D. Van Nostrand Co., page 763, no completely satisfactory plasticizers for resins of the urea-aldehyde or melamine-aldehyde condensation type have in the past been obtained. Some were incompatible with the resin or insoluble in the solvent of the resin. Some did not plasticize the resin. Some were poor in gloss or unstable or lacking in resistance to grease or alkalies or lacking in resistance to temperatures encountered in baking or in service. Some were also too volatile. Among the compounds tested for the purpose have been certain esters of lower glycols and dibasic acids. Such compounds embody a very large class, many members of which have been previously prepared or which are theoretically possible. Among the members of the group may be included the polyesters of ethylene, diethylene and propylene glycols, none of which are very satisfactory. Other compounds which have been proposed as plasticizers of urea-formaldehyde or melamine-formaldehyde resins include N-p-toluene sulfonyl ethanol amines (U. S. Patent No. 2,201,028), blown oil alkyds (U. S. Patent No. 2,112,556), maleic and fumaric esters of polyhydroxy alcohols (U. S. Patent No. 2,166,542). The latter are for water soluble materials.

Probably the least objectionable materials heretofore suggested in the prior art have been the oil modified alkyd resins which have enjoyed considerable use for certain purposes. However, even these compounds have been far from satisfactory. For one thing, very large amounts were required to plasticize the resins and, indeed, a minimum seems to have been approximately 60 parts of the polyester per 40 parts of the resin. Therefore, in a sense the resin would appear to be the modifier of the plasticizer base. In particular, none of the compounds suggested in the prior art has been entirely successful in coatings which were subjected to baking at fairly high temperatures. For one thing, they tended to decompose and discolor at temperatures of 400 and thereabouts, often desired for baking the films. Also, they tended to decompose at temperatures even lower than this if subjected to long exposure.

In my copending application filed of even date herewith and entitled Protective coating compositions Serial No. 652,805, are disclosed as plasticizers of urea-formaldehyde of a class of polyesters of alkyd type embodying dipropylene glycol, an ether derived by condensation of a glycol of relatively high molecular weight, and a dibasic acid containing at least six carbon atoms. These compounds are excellent plasticizers of the particular type of resins and are free of all or most of the objectionable features attending use of the plasticizers heretofore available in the urea or melamine resin art.

The present invention is based upon the discovery that the esters of the same dibasic acids disclosed in my above mentioned application and 2-ethyl hexanediol-1,3 are also plasicizers of unusual merit for use in urea and melamine-formaldehyde resins possessing exceptional stability to heat, unusual effectiveness as plasticizers, excellent color stability and being entirely non-volatile.

Polyesters of 2-ethyl hexanediol-1,3 and various dibasic acids can readily be prepared by the conventional technique involved in the preparation of polyesters of glycols and dibasic acids in general. Preferably, the condensation is effected by heating a mixture of 2-ethyl hexanediol-1,3 and a desired dibasic acid in nearly molar ratio or with a slight excess of the 2-ethyl hexanediol-1,3 in an appropriate container under a reflux condenser. The mixture should also include an organic solvent such as xylene to remove water as it is formed in the reaction, or if solvents are omitted, the water may be removed by passage of an inert gas such as carbon dioxide through the reactants.

Plasticizers of the type herein contemplated include the polyester of 2-ethyl hexanediol-1,3 and such acids as phthalic acids, 2-6 endomethylene-delta-4-tetrahydrophthalic acid and long chain dibasic acids such as azelaic acid, sebacic acid, adipic acid and pimelic acid. Dibasic acids of even longer chain length, for example, up to 12-18 or even 19 carbon atoms for esterification with the 2-ethyl hexanediol-1,3 are also contemplated.

It is often advantageous to employ a mixture of acids in the esterification reaction thereby obtaining mixed polyesters. For example, a cyclic dibasic acid or its anhydride such as phthalic acid (ortho, iso- or tere) or their di, tetra or hexyhydro derivatives, or 3-6-endomethylene-delta-4-tetrahydrophthalic acid in admixture with one of the long chain acids such as adipic acid, pimelic acid or azelaic acid may be heated with the 2-ethyl hexanediol-1,3 to provide polyesters of unusual merit. Commonly, the two dibasic acids are employed in approximately 1 to 1 molar ratio, but it will be appreciated that since the corresponding esters of either of the single acids are also good plasticizers of soluble urea-formaldehyde resins, the polyesters may embody the acids in almost any desired ratio with respect to each other. Of course, the ratio of the total combined acids should be at or slightly below molar with respect to the diol compound. A satisfactory range would appear to be approximately 5 to 95% of the total mixture of acids.

It is often advisable to substitute a polyhydroxy alcohol of a higher functionality for a portion of the 2-ethyl hexanediol-1,3. Such higher polyhydroxy alcohols include glycerine, pentaerythritol, sorbitol, etc. A preferred molar ratio of the diol compound to the polyhydroxy compound is approximately 6 to 1 but this value may be further reduced to as low as 2.5 to 1. The proportion of polyhydric alcohol, of course, can be lower. The polyhydroxy alcohol such as glycerine or pentaerythritol tend to shorten the reaction time and to increase the viscosity of the polyesters, especially when the latter are thinned to normal concentrations as used in the paint industry. The polyhydroxy alcohol also tends to cross-link a portion of the polyester molecules which doubtless is at least in part responsible for the increase in viscosity of the solutions of plasticizers. With a ratio of 6 moles of 2-ethyl hexane-diol-1,3 to 1 mole of polyhydroxy alcohol such as glycerine the resins may be heated for relatively long periods of time at relatively high temperatures with little or no change of properties. However, if it is desired to obtain some degree of heat convertibility in the plasticizers the ratio of polyhydroxy alcohol (glycerine or the like) can be increased, for example, to obtain a ratio of 3-1 between the diol and the polyhydroxy alcohol.

If polyesters of low acid number are desired a slight excess of 2-ethyl hexanediol-1,3 is desired. This excess may conventionally be within a range of 10 to 15% but may be somewhat higher or lower as usages will permit.

The following examples are illustrative of the technique involved in the preparation of a number of different polyesters of the families contemplated herein.

*Example I*

Three hundred twenty-eight kilos of 2-6-endomethylene delta-4-tetrahydrophthalic anhydride and three hundred twelve kilos of 2-ethyl hexanediol-1,3 were heated in fifty minutes to 195° C. The temperature was allowed to reach about 210° in two hours and then increased slowly to 225–230° in about eight hours. The resin was cooled and thinned with toluene to 60% solids. The solution has a body of D on the Gardner-Holdt scale and an acid number of 6.6.

*Example II*

One hundred forty-eight kilos of phthalic anhydride, 146 kilos of adipic acid, 278 g. of 2-ethyl hexanediol 1.3, and 110 liters of a hydrocarbon solvent, e. g. a solvent which contains chiefly aromatic hydrocarbons and has a kauri-butanol value of 90–95, were heated in a flask fitted with an agitator, thermometer and a reflux system permitting separation of the water as formed. The temperature was raised slowly during four hours to 180°, and in about four more hours to 200° C. Thereafter solvent was drained slowly from the system so that in 4.5 more hours the temperature reached 240° C. The batch was cooled and thinned with the same solvent to 82% solids. The solution had a body of Z-3 and an acid number of 7.8.

*Example III*

In a similar manner in the same equipment a mixture in the ratio of 148 kilos of phthalic anhydride, 188 kilos of azelaic acid, 278 kilos of 2-ethyl hexanediol-1,3, 28 g of glycerine and 110 liters of aromatic hydrocarbon solvent such as is referred to in Example II was heated to 230° in 10.5 hours. The product was thinned to 78% solids. The solution had a body of Y and an acid number of 4.2.

*Example IV*

The following mixture was heated in similar equipment to that used in Example II, the ingredients being in a ratio of 148 kilos of phthalic anhydride, 202 kilos of sebacic acid, 278 kilos of 2-ethyl hexanediol, 28 kilos of glycerine and 110 liters of aromatic hydrocarbon solvent such as is referred to in Example II. The batch was carried slowly, in about 11.5 hours, to 230° C. Solvent was removed by drainage from the reflux system near the end of the run to permit the temperature to rise to this point. The product was cooled and thinned to 78% solids. The solution had a body of X and an acid number of 3.3.

These esters are long chain molecules and because of the absence of unstable groups therein, notably unsaturated groups such as are present in drying or semi-drying oil acids or in the oil modified alkyds heretofore employed in the plasticization in the urea-formaldehyde or melamine-formaldehyde resins, they have superior heat resistance and color stability and may be heated to relatively high temperatures for considerable periods of time without appreciable change in properties.

To facilitate the handling of the polyesters after they have been formed, they preferably are diluted with a solvent, for example, an aromatic solvent such as toluene, xylene or other solvents containing a predominant proportion of such aromatic compounds. Alternately they may be thinned with esters such as are used in paints and lacquers, e. g. butyl acetate or the glycol ethers of the Cellosolve type such as the monomethyl, monoethyl or monobutyl ethers. These latter type solvents, however, are relatively expensive. The solutions of esters may be incorporated directly with urea-formaldehyde or urea-malamine resins of the type soluble in non-aqueous solvents.

The esters of the above examples may be combined with urea-formaldehyde or melamine-formaldehyde resins in appropriate non-aqueous solvents and free of pigments and coloring matter in order to form clear finishes having excellent flexibility, good gloss and flow properties. If colored compositions such as enamels for refrigerators or other applications are desired, pigments and coloring matters such as titanium pigments or other materials may be incorporated in appropriate amount for example, in ratios of 15 to 60% based upon the total solids content of the compositions.

The solvents for the resins and the plasticizers thereof may be in substantially any convenient proportion to the resin and plasticizer content, for example, within a range of 40 to 90% dependent upon the viscosity desired in the coating solutions.

It will be apparent that modifying resins such as kopal, kauri, damar, ester gums and nitro-cellulose in amounts, for example, of 5 to 50% based on total plastics in the solutions may be combined with the urea-formaldehyde or melamine-formaldehyde resins.

Coating compositions prepared as above described and including the polyesters and the resins in appropriate solvents may be applied to substantially any surface such as steel or metal either primed or unprimed by spraying, brushing or other methods. The solvents may be evaporated off at room temperature but in many cases it is preferred to bake the coatings by application of infra-red rays or in a suitable oven. In the latter, the temperatures may go up to 400° F. or even above without discoloration or decomposition of either the resins or plasticizers contained therein and without appreciable volatilization of the plasticizers.

The use of the polyesters of dibasic acid and 2-ethylene hexanediol-1,3 in the plasticization of urea-formaldehyde or melamine-formaldehyde resins in solutions employed for coating purposes has been particularly emphasized. Such use is of particular advantage owing to the combined compatibility of the polyesters with the resins in the solvents for the resins. However, it is evident that the same polyesters can also be employed to plasticize urea resins employed in casting operations or in molding powders or the like. In a casting operation it would appear preferable to incorporate the polyesters of the 2-ethyl hexanediol-1,3 and the dibasic acids into the polymerizable mixtures of formaldehyde and urea or formaldehyde and melamine before the latter become hardened into solid state. However, it would appear feasible to add the polyesters to solutions of the resins and then to evaporate the solvents.

The solutions of resins and the polyesters may be used to impregnate fabrics and fibrous materials in order to impart rigidity or other desired properties thereto or to laminate wood or fabrics of cotton or glass fibers. It is also feasible to introduce the resins and plasticizers into or to apply the resins and plasticizer to fibers such as wood flour or alpha cellulose employed in the preparation of molding powders. Powders impregnated with or consisting of urea-formaldehyde or urea-melamine may be also plasticized by admixing the powders with polyesters. Upon molding of such mixture under heat and pressure the plasticizer permeates into the resin in the powders.

Soluble urea-formaldehyde type resins suitable for use in the practice of the invention are most readily obtained by inclusion of an alcohol component such as n-butyl alcohol in the mixture of urea and formaldehyde condensed to form the resin. The substitution of other alcohols capable of rendering the resin soluble is contemplated.

Reference is made to applicant's application filed of even date and respectively entitled:

"Coating composition comprising an amide aldehyde resin and a polyester of an alpha-alkyl ether of glycerol and a dicarboxylic acid as a plasticizer," Serial No. 652,807.

The forms of the invention herein described exemplify the invention. However, it will be manifest to those skilled in the art that numerous modifications may be made therein without departure from the spirit of the invention or the scope of the appended claims.

I claim:

1. An alcohol modified urea-formaldehyde resin which is soluble in organic solvents, said resin being plasticized with a compatible plasticizer a polyester of 2-ethyl hexanediol-1,3 and a dicarboxylic acid containing at least 6 to 19 carbon atoms.

2. An alcohol modified urea-formaldehyde resin, said resin being plasticized with a compatible plasticizer a polyester of 2-ethyl hexanediol-1,3 and a dicarboxylic acid containing 6 to 19 carbon atoms in the chain.

3. An alcohol modified urea-formaldehyde resin soluble in organic solvents, said resin being plasticized with a compatible plasticizer a polyester of 2-ethyl hexanediol-1,3 and an open chain dicarboxylic acid containing 6 to 10 carbon atoms in the chain.

4. As an improved coating composition adapted to dry when spread as a film into flexible adherent state, an alcohol modified urea-formaldehyde resin dissolved in an organic solvent and containing in solution therewith as a compatible plasticizer in an amount to provide a plasticized resin body when the solvent is evaporated therefrom, a polyester of 2-ethyl hexanediol-1,3 and a dicarboxylic acid containing 6 to 19 carbon atoms in an open chain.

5. As an improved coating composition, an alcohol modified urea-formaldehyde resin dissolved in an organic solvent containing in solution as a compatible plasticizer a polyester of 2-ethyl hexanediol-1,3 and phthalic acid in an amount to plasticize the composition when the solvent is evaporated.

6. As an improved coating composition, an alcohol modified urea-formaldehyde resin dissolved in an organic solvent and containing in solution therewith as a compatible plasticizer a polyester of 2-ethyl hexanediol-1,3 and 3-6 endomethylene - delta - 4 - tetrahydrophthalic acid in an amount to provide a plasticized resin body when the solvent is evaporated.

7. As a new composition of matter an amino plastic comprising a condensation product of a formaldehyde and an amide of a class consisting of urea and melamine, said plastic being soluble in organic solvents and being plasticized with a polyester of 2-ethyl hexanediol-1,3 and a dicarboxylic acid containing 6 to 10 carbon atoms.

8. A composition as defined in claim 7 in which the dicarboxylic acid is phthalic.

9. A composition as defined in claim 7 in which the dicarboxylic acid is cyclic.

10. A composition as defined in claim 7 in which the dicarboxylic acid is open chain.

11. Melamine-formaldehyde resin plasticized with 2-ethyl hexanediol-1,3, polyester of a dicarboxylic acid containing 6 to 10 carbon atoms.

12. A coating composition comprising soluble melamine-formaldehyde resin dissolved in a non-aqueous solvent containing in solution a 2-ethyl hexanediol-1,3 polyester of a dicarboxylic acid, said acid containing 6 to 10 carbon atoms, said ester being an amount to plasticize the composition when the solvent is evaporated.

13. As an improved coating composition an alcohol modified urea-formaldehyde resin of soluble grade dissolved in an organic solvent therefor and containing in solution therewith as a compatible plasticizer, a mixed polyester of 2-ethyl hexanediol-1,3 and a mixture of (A) phthalic acid and (B) an open chain dicarboxylic acid containing 6 to 19 carbon atoms, said polyester being in an amount to plasticize the composition when the solvent is evaporated.

14. A melamine-formaldehyde resin soluble in organic solvents polyester plasticized with a 2-ethyl hexanediol-1,3 polyester of a dicarboxylic acid containing 6 to 19 carbon atoms.

15. As an improved coating composition an alcohol modified urea-formaldehyde of a grade soluble in non-aqueous organic solvents, said resin being dissolved in a solvent therefor and containing in solution therewith a mixed polyester of 2-ethyl hexanediol-1,3 and a mixture of (A) a cyclic dicarboxylic acid and (B) an open chain dicarboxylic acid containing 6 to 19 carbon atoms in an amount to plasticize the coating composition when the solvent is evaporated.

16. A coating composition as defined in claim 15 in which the carboxyls of the second mentioned acid are in terminal positions in the carbon chain.

17. A coating composition as defined in claim 15 in which the cyclic dicarboxylic acid is phthalic acid.

EUGENE W. MOFFETT.

(No references cited.)